INVENTORS
LLOYD E. BERGGREN
GORDON B. SCHNEIDER
HAROLD P. SORENSEN
BY
George H Fisher
ATTORNEY

INVENTORS
LLOYD E. BERGGREN
GORDON B. SCHNEIDER
HAROLD P. SORENSON
BY
ATTORNEY

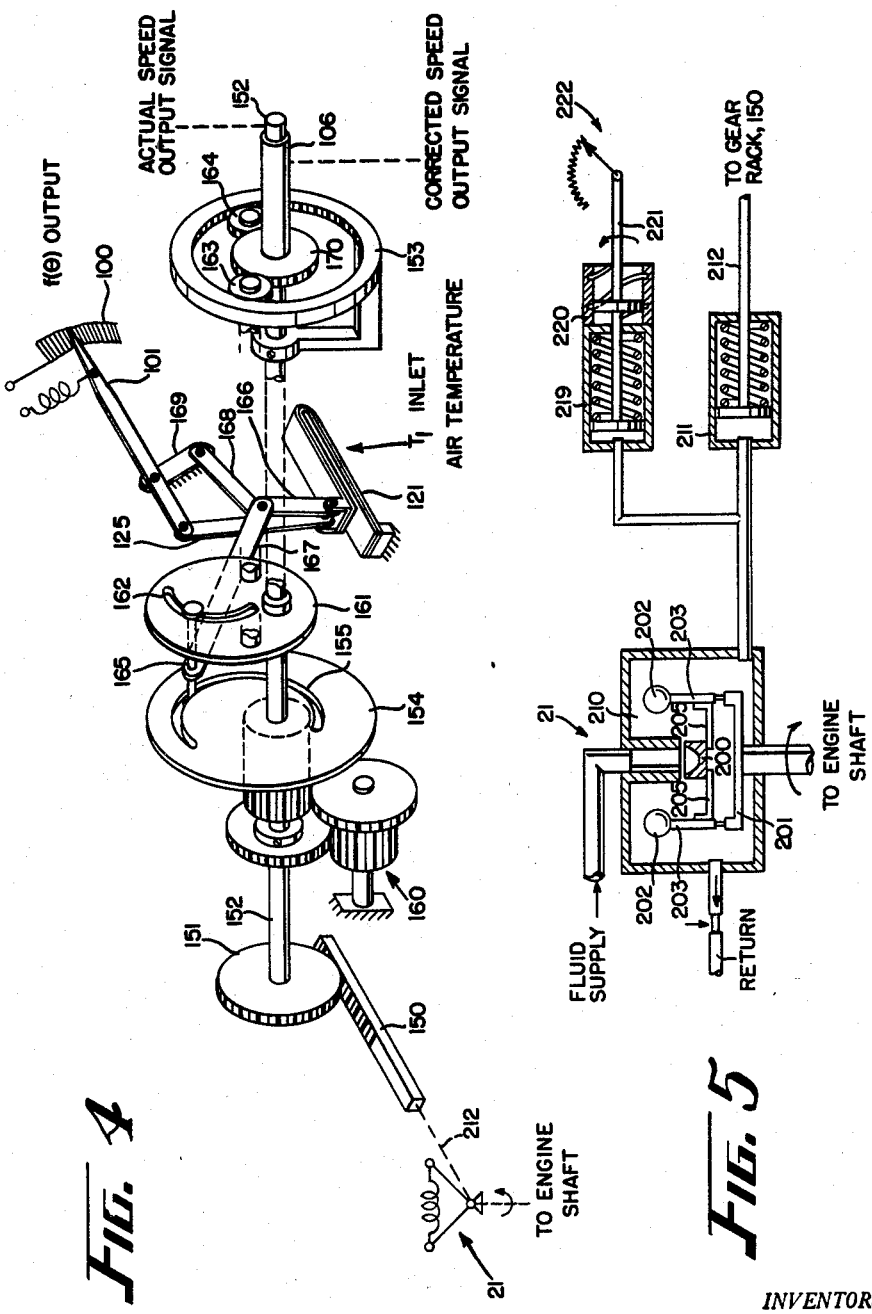

United States Patent Office 2,943,448
Patented July 5, 1960

2,943,448

JET ENGINE CONTROL APPARATUS

Lloyd E. Berggren, Minneapolis, Gordon B. Schneider, Moundsview Township, Ramsey County, and Harold P. Sorensen, Minneapolis, Minn., assignors to Minneapolis-Honeywell Regulator Company, Minneapolis, Minn., a corporation of Delaware Filed Aug. 20, 1954, Ser. No. 451,176

4 Claims. (Cl. 60—39.28)

The present invention is concerned with an improved control apparatus for combustion engines of the gas turbine type. More particularly, the invention is concerned with apparatus for determining the corrected speed of the engine and thereby scheduling the fuel control of the engine.

In the past, fuel control for gas turbine engines was primarily accomplished through actual speed control and temperature control apparatus. In recent years with the improved materials for withstanding higher temperatures and greater loads, as well as the increased pressure ratios of engine compressors, engines are more susceptible to surge. In order to obtain maximum acceleration of the engine, it is desirable to operate the engine at the highest safe temperature and, while this temperature limit is dependent on material strength and the makeup of the engine, it is more often limited by the surge characteristics, or that part of the engine operating schedule in which surge occurs.

In the present control apparatus the maximum safe operating temperature in the combustion chamber is controlled in accordance with a corrected speed schedule and, in a predetermined range of corrected speed, the maximum engine temperature is reduced so that surging will not occur in the engine compressor.

Corrected speed is commonly known in thermodynamics to be $N/\sqrt{\theta}$, where N is the actual engine speed and $\theta$ is a nondimensional number equal to 460 plus the inlet air temperature in Fahrenheit degrees divided by 519. When $\theta$ is equal to one, the corrected speed is obviously equal to the actual speed, this being the case when the inlet air temperature equals 59 degrees Fahrenheit. While apparatus is available to perform a division of two known quantities, such apparatus is not adaptable to this type of control apparatus mainly because the forces available from the inlet air temperature sensor are small, therefore a novel apparatus is used to approximate the division to obtain empirical results in the speed range required. This empirical approximation $N^2/\theta$ is equal to $N^2 - fN^2(\theta)$, therefore the apparatus of this invention provides a mechanical output indicative of corrected speed through a selected range of actual engine speed.

It is therefore an object of the present invention to provide an improved apparatus for scheduling fuel flow to a combustion engine.

Another object of the present invention is to provide apparatus for limiting the maximum engine temperature in accordance with a corrected engine speed schedule.

Another object of the present invention is to schedule the maximum engine temperature in accordance with the corrected engine speed as determined from the parameters actual engine speed and engine inlet air temperature.

Another object of the present invention is to provide apparatus in which the division of two variables is approximated through a predetermined range of both variables.

These and other objects of the present invention will be understood upon considering the following specification and appended drawings of which:

Figure 4 is a perspective of the corrected speed control apparatus;

Figure 5 is a schematic showing of the speed sensor.

Figure 1:
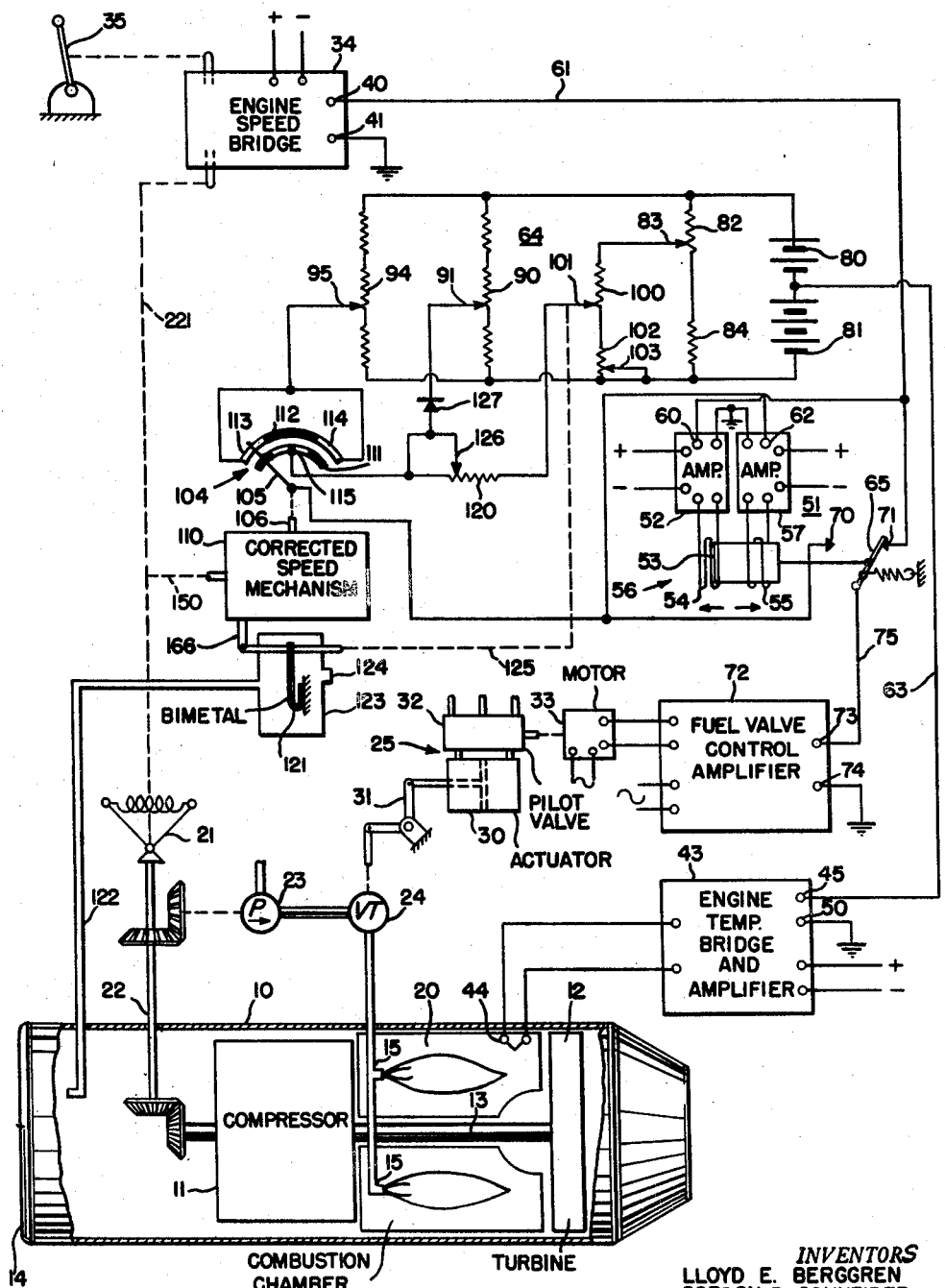
Figure 1 is a schematic showing of a control apparatus for a combustion engine of a gas turbine type.

Referring to Figure 1, a combustion engine 10 of the gas turbine type is shown having a compressor 11 connected to a turbine 12 by a shaft 13. Air is received in the inlet 14 of the engine, compressed by the compressor, mixed with fuel flowing from nozzles 15, and burned in a combustion chamber 20. A speed sensor or governor 21 is connected by a shaft 22 to shaft 13 of the engine. Shaft 22 also drives a pump 23 supplying fuel from a source (not shown) to nozzles 15 through a throttling valve 24, the valve being controlled by a conventional hydraulic apparatus 25 comprising an actuator 30 connected to the valve by linkage 31. Actuator 30 is controlled by a pilot valve 32 which is operated by a reversible electric motor 33.

An engine speed control apparatus or bridge 34 preferably of a type indicated by number 30 in the application for Letters Patent of Bancroft et al. Serial No. 412,998, filed March 1, 1954, is connected to speed sensor 21 and a control lever 35. The speed error output of the speed bridge depends on the deviation between the actual speed of the combustion engine and the selected speed as determined by the position of the control lever. During a steady state operating condition, there is no output at terminals 40 and 41. When the control lever is moved to the right in a direction to increase the engine speed, the output of bridge 34 is, for example, assumed to be a positive voltage which is reduced to zero as the engine speed increases to the selected speed. For deceleration, movement of the control lever to the left then produces a negative output voltage at terminals 40 and 41.

An engine temperature bridge and amplifier 43, preferably of a type indicated by numbers 50 and 76 in the above mentioned Bancroft et al. application, has a thermocouple 44 connected thereto, the thermocouple sensing the temperature in combustion chamber 20. The polarity and magnitude of the output of the temperature bridge at terminals 45 and 50 depends upon the temperature in the combustion chamber.

An acceleration signal selector network circuit 51 includes amplifiers 52 and 57 controlling a differential relay 56 through windings 54 and 55 respectively. The amplifiers 52 and 57 are preferably of a type similar to the disclosure in Figure 15d, page 376, of Terman's Radio Engineers' Handbook, first edition, ninth impression. The polarity of the D.C. output received by windings 54 and 55 depends on the polarity of the D.C. input. The engine speed control apparatus 34 is connected to input terminal 60 of amplifier 52 by a conductor 61 and the engine temperature bridge 43 is connected to an input terminal 62 of amplifier 57 by a circuit comprising a conductor 63 and a temperature schedule and summation network circuit 64. Circuit 64 comprises a plurality of branch circuits connected to sources of D.C. voltage such as batteries 80 and 81, between which conductor 63 is connected; a first branch including a resistor 82 having a movable tap 83 thereon and a resistor 84, a second branch including a resistor 90 having a movable tap 91 thereon, and a third branch including a resistor 94 having a movable tap 95 thereon. Connected in parallel with resistor 84 is a resistor 100 having one end connected to tap 83 and its other end to a resistor 102 adjustable by a wiper 103. A scheduling switch 104 has a movable wiper 105 connected to input terminal 62 and to a relay contact 70. The wiper 105 is driven by a corrected speed mechanism 110 shown in detail in Figure 4. Wiper 105 engages a pair of arcuate members 111 and 112, member 112 having an intermediate insulated portion and two conducting surfaces 113 and 114 at its extremities, both of these conducting surfaces being connected to wiper 95. Member 111 has an intermediate conducting surface 115 connected by suitable conductors and resistor 120 to a wiper 101 movable along resistor 100. As wiper 105 is moved from left to right it provides a connection between wiper 95 and amplifier 57 through a first increment of its angular movement; a connection between wiper 101 and amplifier 57 through a second increment of its movement and, for the remaining movement of wiper 105, connection being re-established between wiper 95 and amplifier 57.

Referring to Figure 4, corrected speed mechanism 110 includes a gear rack 150 connected to speed sensor 21 providing for movement of the rack in proportion to the square of actual engine speed. As shown schematically in Figure 5, sensor 21 comprises a valve 200 for controlling the flow of servo fluid from a source (not shown). The valve is operated by a flyball governor. The governor has a yoke member 201 having weights or balls 202 connected at the extremities of its vertical members 203. Vertical members 203 have a thin section so that upon rotation of the yoke member about its axis when connected to engine shaft 13, the outward movement of the vertical members is transferred through arms 205 to close valve 200. As the amount of movement of weights 205 required to operate valve 200 is small, the pressure developed in governor chamber 210 as well as the pressure applied to actuator 211 is proportional to the square of the angular velocity of the governor or the square of engine speed. The output shaft 212 whose movement is proportional to $N^2$ is connected to gear rack 150 of corrected speed mechanism 110. A second actuator 219 has an output shaft connected to a cam follower 220 so that angular movement of an output shaft 221 is provided proportional to engine speed. Shaft 221 is connected to a potentiometer 222 which is a part of engine speed bridge 34 shown in block form in Figure 1. Gear rack 150 engages a gear 151 fixed on a shaft 152 which is connected to a ring gear 153 of a summation mechanism comprising an epicyclic gear train so that movement of ring gear 153 is also proportional to the square of the actual engine speed. A disc 154 having a cam slot 155 therein is pivotally connected to shaft 152 and proportionally rotated about shaft 152 by a gear train 160 to amplify the movement of cam 154 for a given motion of shaft 152. A second disc 161 having a cam slot 162 therein is pivotally connected to shaft 152 and has a pair of planet gears 163 and 164 of the summation mechanism connected thereto. A pin 165 supported parallel to shaft 152 and engaging cam slots 155 and 162, is positioned by a temperature responsive element or bimetal 121 connected thereto by a linkage comprising links 166 and 167. Element 121 responds to the inlet air temperature of the jet engine, moving upward upon an increase in the temperature. Links 166 and 167 are connected at their common junction to link 168 which is pivotally connected to a portion of a body casting 169 (not shown). Movement of disc 161 results from the combined movements of disc 154 and pin 165 so that the planet gears are positioned as a function of $N^2$ and $\theta$. The output of the summation mechanism, as determined by the position of the sun gear 170, is therefore indicative of the corrected speed of the engine and the movement of shaft 106 attached to gear 170, as well as wiper 105, is proportional to the corrected speed of the engine. The corrected speed mechanism described thus approximates the mathematically calculated corrected speed through the selected speed range.

Figure 3:
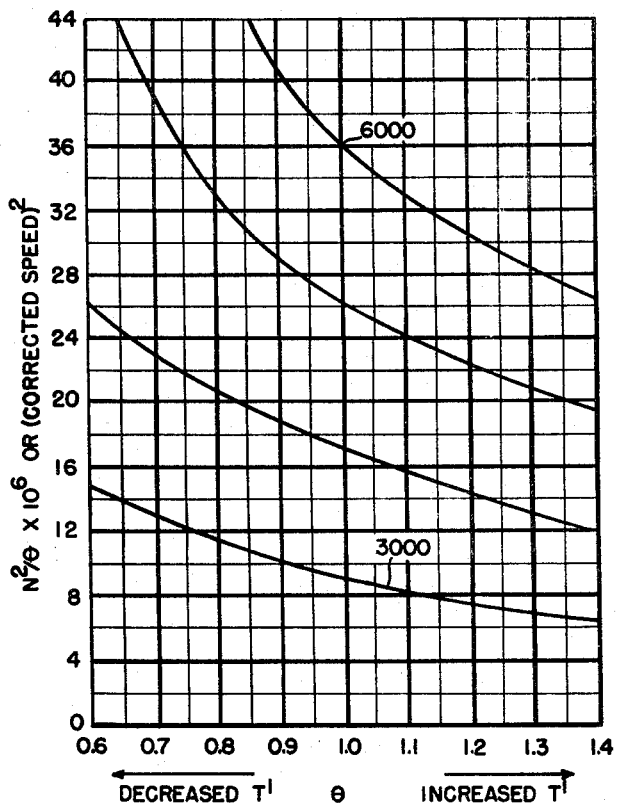
Figure 3 is a graphical representation of corrected speed vs. theta, a function of inlet air temperature of the engine.

Referring to Figure 3 a graphical representation of various values of mathematically calculated corrected speed vs. theta is shown, the curves being for different values of actual speed ranging from 3,000 to 6,000 r.p.m. The corrected speed mechanism empirically duplicates the characteristics shown in Figure 3, so that upon measuring the actual speed of the engine and correcting it by the inlet air temperature, determined by element 121, the wiper 105 will be moved proportionally to the corrected engine speed. Assume that the actual engine speed is 3,000 r.p.m. and the temperature of the inlet air is 59 degrees Fahrenheit, the corrected speed equals the actual speed. This is shown by the intersection of the 3,000 r.p.m. actual speed curve and a line extending above the $\theta=1$ point on the abscissa axis. With theta equal to one, the pivot point of link 167 is such that pin 165 moves through an arc coinciding with cam slot 162 so that movement of the pin upon rotation of disc 154 has no effect upon the position of planet gears 163 and 164. Thus whenever theta equals one, the axis of the planet gears remains stationary and the actual speed equals the corrected speed. Assume that the temperature of the inlet air increases until theta equals 1.2; element 121 lifts link 166 to shift the pivot point of link 167 upward and leftward so that pin 165 no longer swings on link 167 through an arc coinciding with cam slot 162. Disc 161 is then relocated in a counterclockwise direction and the position of the gear 170 now depends on the combined movement of both the ring gear and the planet gears, so that at an actual speed of 3,000 r.p.m. the corrected speed is approximately $1\sqrt{7.5 \times 10^6}$ or 2,738 r.p.m. at $\theta=1.2$. Similarly at other actual speeds the planet gears are repositioned so that the position of shaft 106 is indicative of the corrected speed, such as, for an actual speed of 6,000 r.p.m. the corrected speed is approximately $\sqrt{30.5 \times 10^6}$ or 5,523 r.p.m. at $\theta=1.2$.

Should the inlet air temperature decrease, the pivot point of link 167 is moved in the opposite direction as link 168 pivots about 169; however, the new pivot point for link 167 establishes a different relation between discs 154 and 161. At 3,000 r.p.m. and $\theta=0.65$ the corrected speed is now $\sqrt{14 \times 10^6}$ or 3,714 r.p.m., or greater than the actual speed, and shaft 106 would be advanced ahead of the position it assumed when $\theta=1$ for the same actual speed.

It should be understood that the shape of cam slots 162 and 155 and the associated linkages are designed so that the output of the corrected speed apparatus approximately duplicates the mathematical results shown in Figure 3. While the apparatus approximates the results between the speed range of 3,000 to 6,000 r.p.m. it is apparent that the design is adaptable to other speed ranges.

A relay 56 has an armature 53 connected to a switch blade 65 selectively engaging either of contacts 70 and 71, contact 71 being connected to the speed bridge 34 and contact 70 being connected to the temperature bridge 43 through circuit 64. Normally, blade 65 is biased against contact 71. The arrows adjacent relay 56 indicate the direction of the force each winding 54 and 55 exerts on armature 53 whenever the outputs of the speed bridge and temperature bridge, respectively, are positive. When the outputs of the temperature bridge and speed bridge are both positive the larger of the two outputs, disregarding the bias, will determine which contact blade 65 engages.

A fuel valve control amplifier 72 has input terminals 73 and 74, terminal 73 being connected by conductor 75 to blade 65 and terminal 74 being grounded. Amplifier 72 is of a sort similar to the disclosure of the Walter P. Wills Patent 2,423,540, issued July 8, 1947, having a D.C. input whose polarity determines the direction of rotation of an associated motor. The output of the amplifier energizes motor 33 which controls the operation of the aforementioned control apparatus 25. A positive voltage signal impressed on amplifier 72 operates motor 33 to open fuel valve 24, a negative signal having the reverse effect. As hydraulic control apparatus 25 has a fast response, the fuel valve is adjusted in either an opening or closing direction as the input signal to amplifier 72 rapidly changes from positive to negative and vice versa. As shown, the fuel valve is under the control of the engine speed bridge; however, should the output of the speed bridge increase until the effect of winding 54 overcomes the effect of winding 55, blade 65 will move against contact 70 to place the fuel valve under the control of the temperature bridge.

Figure 2:
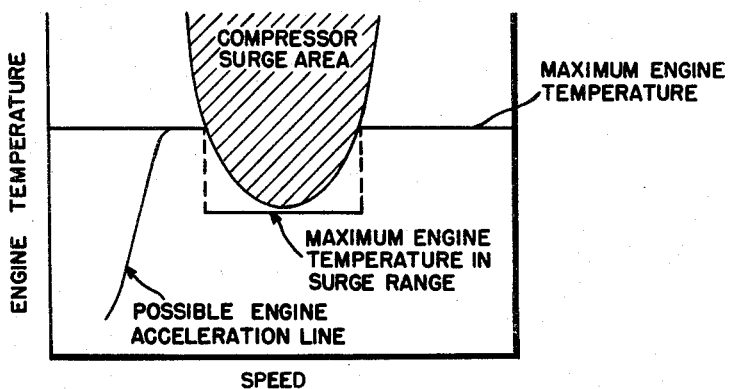
Figure 2 is a graphical representation of the maximum engine temperature vs. corrected speed of the engine.

Referring to Figure 2 a performance map of engine temperature vs. speed is shown. The compressor surge area is that range of operation where the phenomenon of surge takes place in the compressor and can result in destruction of the engine, it therefore is necessary to schedule fuel flow so that such surging does not occur. For a particular engine it is possible from certain data to determine the engine temperature at particular speeds at which surging will occur. The surge curve actually consists of a family of curves that lie on any part of the map depending on the inlet air temperature of the engine. When engine speed is corrected, that is corrected engine speed equals $N/\sqrt{\theta}$, the family of curves is limited to a series above and below a curve such as shown. Furthermore, when the engine temperature is corrected, it being $T/\theta$, and not speed, the family of curves lie to the left and right. In the speed range shown below the surge area, fuel flow must be limited to maintain the reduced temperature; however, it is desired to operate as close to the surge area as practical. As mentioned before the surge area boundary moves up and down with variations in the temperature of inlet air to the engine thus the temperature must be corrected by a signal indicative of inlet air temperature. For example, when the aircraft is flying near the ground and the inlet air temperature is high, the surge area will drop, requiring a lower temperature to avoid surge in that speed range.

Temperature responsive element 121 is subjected to inlet air as ram air passes through a conduit 122 and a chamber 123 and exits through a passage 124. Element 121 is also connected by a suitable linkage 125 to wiper 101 for adjusting the same along resistor 100. At low values and high values of corrected speed, when the wiper 105 engages conducting surfaces 113 and 114, the maximum engine temperature is set by the position of wiper 95, it not being biased by inlet air temperature. During the range of speed in which the maximum engine temperature must be reduced to prevent surging, this range being determined by the length of conductive surface 115, the maximum combustion chamber temperature is modified by the inlet air temperature or wiper 101. Wiper 101 is moved upward on resistor 100 as the inlet air temperature increases to decrease the maximum temperature allowable. Wipers 83, 103, and 126 adjust the values of resistors 82, 102, and 120 for calibration purposes.

Wiper 126 is connected to wiper 91 through a unidirectional conductor 127 of a selenium rectifier type so that the output of the temperature bridge, as wiper 101 moves upward, is limited to the maximum output as selected by the position of wiper 91. Should the voltage at wiper 101 exceed that at wiper 91, a current will flow upward through conductor 127 and a voltage drop exists across resistor 120 to limit the output thus limiting the maximum engine temperature during operation in the speed range where surging can occur to that selected by wiper 91.

*Operation*

Referring to Figure 1, the control apparatus is illustrated with the engine operating at some low steady state speed and the speed bridge is satisfied, that is, the selected speed equals the actual speed. Under such a steady state condition the engine temperature is normally relatively low and the output voltage of temperature schedule and summation network 64 as applied to amplifier 57 is positive and higher than the output voltage of the speed bridge as applied to amplifier 52. Blade 65 is held against the contact 71 so that speed bridge 34 maintains control of the fuel valve. Upon moving control lever 35 to the right, the speed bridge is adjusted to provide an output calling for an increase in speed. If the output is large enough to be more positive than the output of the temperature bridge, relay 56 will move blade 65 against contact 70 to place the engine temperature bridge 43 in control of the fuel valve to provide for maximum acceleration of the engine speed. A typical engine acceleration line, shown in Figure 2, is followed and the fuel flow is controlled by the temperature control network so as not to exceed the maximum engine temperature as set by the position of wiper 95. As the engine speed increases and the surge area is approached, wiper 105 of switch 104 switches the control of the fuel valve to the network connected to segment 115 to maintain a lower maximum engine temperature. The maximum combustion temperature allowable from the surge standpoint, with the inlet air temperature at 100° Fahrenheit, as might be the case near sea level, is much lower than the maximum engine temperature allowable when the inlet air temperature is 0° Fahrenheit, therefore, to operate as close to the surge area as possible, the temperature control network is biased by a function of $\theta$. This is done in the speed range below the surge curve when wiper 105 engages segment 115 and the voltage developed by the wiper 101 on resistor 100 modifies the output of bridge 43. When the corrected engine speed has reached such a value that wiper 105 engages segment 114, the fuel flow is again increased until the selected speed is attained, the higher maximum engine temperature not being exceeded.

Corrected speed mechanism 110, as shown in Figure 4, is responding to inlet air at a temperature ($T_1$) approximately 59° Fahrenheit and the movements of output shafts 106 and 152 are approximately the same, the corrected speed being equal to the actual speed. As the inlet air temperature increases the $f(\theta)$ output increases, as wiper 101 moves upward on resistor 100, to increase the maximum engine temperature allowable in the speed range below the surge area. The increased inlet air temperature also re-establishes the relation between discs 154 and 161 so that the corrected speed no longer equals the actual speed, the value of corrected speed falling below the actual speed as indicated in Figure 3. With a low inlet air temperature the reverse takes place as the corrected speed exceeds the actual speed.

Without the corrected speed mechanism to schedule fuel flow to the engine, a relatively wide speed range through which the engine temperature limit is reduced would be required for safe operation to insure that surging did not occur in the compressor. This reduction in engine temperature not only reduces the engine efficiency but lowers the maximum acceleration available in the engine speed which directly affects the thrust available, thus a minimum amount of temperature reduction is desired.

The present apparatus provides for scheduling of fuel flow to the engine during engine acceleration so that the safe engine temperature is maintained at all times. The maximum temperature is reduced only through a predetermined range of corrected speed so that fuel flow will not be limited unless necessary to prevent surging in the compressor which can be destructive and often shortens the operating life of the engine.

The operation of the invention has been explained with the fuel valve under the control of the temperature network; however, it should be understood that when the output of the speed bridge is negative with respect to the temperature bridge signal, upon the selected speed being attained, the speed bridge is again placed in control of the fuel valve. During the transient operation, fuel flow being controlled by the temperature bridge, the fuel valve is modulated to maintain the temperature in the combustion chamber at the maximum value. The input to amplifier 72, as well as amplifier 57, from the temperature bridge modulates about zero; however, as long as a large speed error exists the blade 65 engages contact 70 as winding 54 dominates the effect of 55. As the selected speed is attained and the speed error signal is less effective, the armature 53 moves to the right to restore fuel flow to speed control.

The maximum engine temperature, when the engine is operating in the speed range where engine surging might take place, is determined by the position of the wiper 101 in response to the inlet air temperature element 121. Under certain conditions when the inlet air temperature is very low, it is possible for the surge area to move upward on the performance map so that the engine temperature control apparatus in the surge range might allow the engine to exceed the maximum engine temperature on either side of the surge range as determined by the position of wiper 95. This is prevented by the position of wiper 91 which is set to limit the engine temperature in the surge range.

On deceleration of the engine the speed bridge has a negative output and normally the temperature is low and bridge 43 has a positive output, thus blade 65 engages contact 71 to maintain the fuel flow under the control power lever position.

While the corrected speed mechanism of the control apparatus produces an output which approximates the quotient of two functions it should be understood that this mechanism is not restricted to engine control apparatus but could be adapted wherever an empirical approximation of the division of two functions need be accomplished; however, it is intended that the invention be limited only by the scope of the appended claims in which we claim:

1. In control apparatus for a combustion engine of the gas turbine type, engine temperature network circuit means having first engine combustion chamber temperature responsive means connected thereto, engine speed responsive means, automatic changeover means, engine fuel controller means, connection means connecting said temperature network circuit means and said speed responsive means in controlling relation to said automatic changeover means so that one or the other of said means effectively controls said engine fuel controller means, second engine temperature responsive means responsive to inlet air temperature operatively connected to said network circuit means for changing the relative effectiveness of said first engine temperature responsive means, and schedule means connected to said network circuit means, said schedule means comprising a first cam whose position is proportional to the square of the actual speed of the engine, a second cam, a cam rider engaging said first cam and said second cam, said rider being positioned by said second temperature responsive means so that the position of said second cam results from the combined position of said first cam and said rider, a planetary gear system having a ring gear connected to said engine speed responsive means and a plurality of planet gears connected to said second cam so that the position of a sun gear is indicative of the corrected engine speed, and switch means operatively connected to said sun gear changing the effectiveness of said first temperature responsive means.

2. In control apparatus for a combustion engine of a gas turbine type, first engine temperature responsive means responsive to the temperature in the combustion chamber, engine speed responsive means responsive to the speed of rotation of the engine, engine fuel control means, automatic control means, connection means including said automatic control means for connecting either said temperature responsive means or said speed responsive means in controlling relation to said fuel control means, second engine temperature responsive means responsive to the temperature of the inlet air to the engine, first circuit means including means adjusted by said second temperature responsive means, and scheduling switch means for selectively connecting said first circuit means in a manner to bias the effect of said first engine temperature responsive means, said switch means being driven by a corrected speed mechanism comprising first mechanical means being positioned by means responsive to the square of the actual speed of the engine, second mechanical means, rider means positioned by said second temperature responsive means and engaging said first and second mechanical means so that said second mechanical means is positioned by the combined effect of the square of the actual speed of the engine and the inlet air temperature, a summation mechanism having said second mechanical means and said speed responsive means connected thereto driving said scheduling switch means.

3. In control apparatus for a combustion engine, engine fuel control means, first engine temperature responsive means responsive to the temperature of the combustion chamber of the engine, circuit means connecting said temperature responsive means in a controlling relation to said fuel control means, said circuit means comprising a first branch having means operated in response to the output of a second engine temperature responsive means responsive to inlet air temperature, and a second branch, switch means operated in response to corrected engine speed for selectively connecting either of said branches into said circuit means so that when said first branch is used the effect of said first engine temperature responsive means on said fuel control means can be biased in response to inlet air temperature, corrected speed means for operating said switch means, said corrected speed means comprising mechanism having an output proportional to the quotient of the square of the actual engine speed divided by $\theta$ which is equal to 460 plus inlet air temperature in Fahrenheit degrees divided by 519, said mechanism comprising a first and second surface engageable by a rider, said first surface being proportionally positioned by means responsive to the square of the actual engine speed, said rider being positioned by said inlet air temperature responsive means, connection means connecting said second surface and said actual engine speed responsive means so that the combined effect operates said switch means.

4. In control apparatus for an engine of the gas turbine type, means responsive to a condition indicative of combustion chamber temperature, means responsive to engine speed, means responsive to engine inlet temperature, means for varying the supply of fuel to said engine, switching means, means including said switching means connecting said speed responsive means to control said fuel supply varying means, means including said switching means connecting said means indicative of combustion chamber temperature to control said fuel varying means, said switching means permitting one or the other of said speed responsive means or said means responsive to a condition indicative of combustion chamber temperature to control said fuel supply varying means, means biasing said switching means so that said speed responsive means normally controls said fuel supply varying means, and means operating said switching means in accordance with the joint effect of said speed responsive means, said inlet temperature responsive means and said means responsive to a condition indicative of combustion chamber temperature so that said means indicative of combustion chamber temperature controls said fuel varying means, said inlet temperature responsive means cooperating with said speed responsive means and said means responsive to a condition indicative of combustion chamber temperature to vary the value of combustion chamber temperature at which said means responsive to a condition indicative of combustion chamber temperature is able to overcome the effect of said speed responsive means and said biasing means and cause said switching means to operate in a manner causing said means indicative of combustion chamber temperature to control said fuel supply varying means.

References Cited in the file of this patent

UNITED STATES PATENTS

| | | |
|---|---|---|
| 2,545,703 | Orr | Mar. 20, 1951 |
| 2,581,276 | Mock | Jan. 1, 1952 |
| 2,623,354 | Best | Dec. 30, 1952 |
| 2,648,194 | Jorgensen et al. | Aug. 11, 1953 |
| 2,652,813 | Reuter et al. | Sept. 22, 1953 |
| 2,669,093 | Lee | Feb. 16, 1954 |
| 2,694,900 | Brandau | Nov. 23, 1954 |
| 2,743,578 | Hazen | May 1, 1956 |
| 2,762,194 | Kunz et al. | Sept. 11, 1956 |
| 2,786,331 | Williams | Mar. 26, 1957 |
| 2,807,138 | Torrell | Sept. 14, 1957 |